Sept. 15, 1942.            P. J. HOWE ET AL            2,295,994
                    ILLUMINATED DISPLAY DEVICE
                    Filed July 10, 1940            4 Sheets-Sheet 2
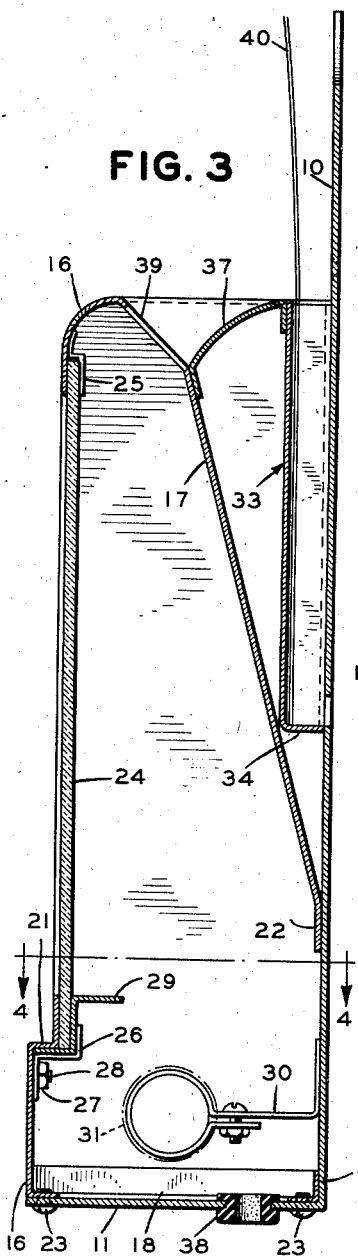
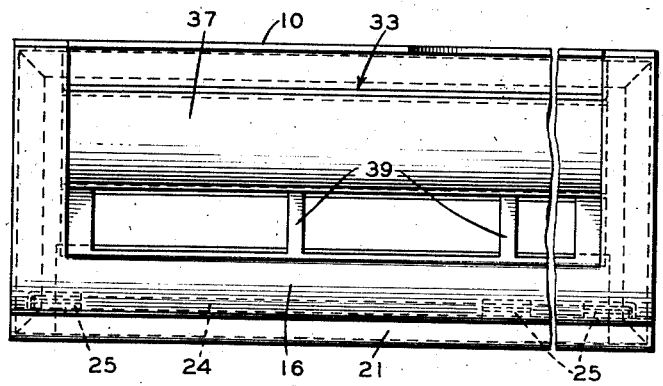
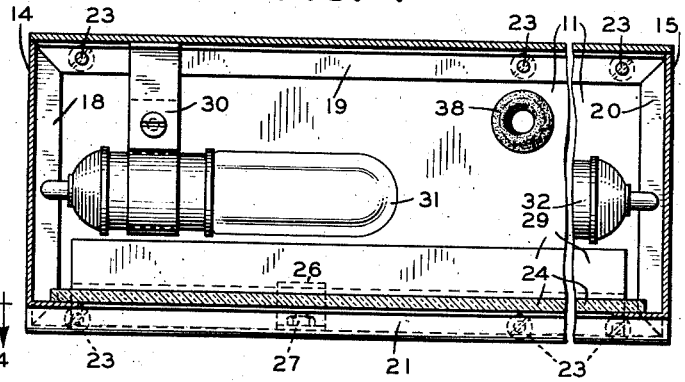
INVENTORS
P. J. HOWE
C. H. WYSS, JR.
BY
ATTORNEY

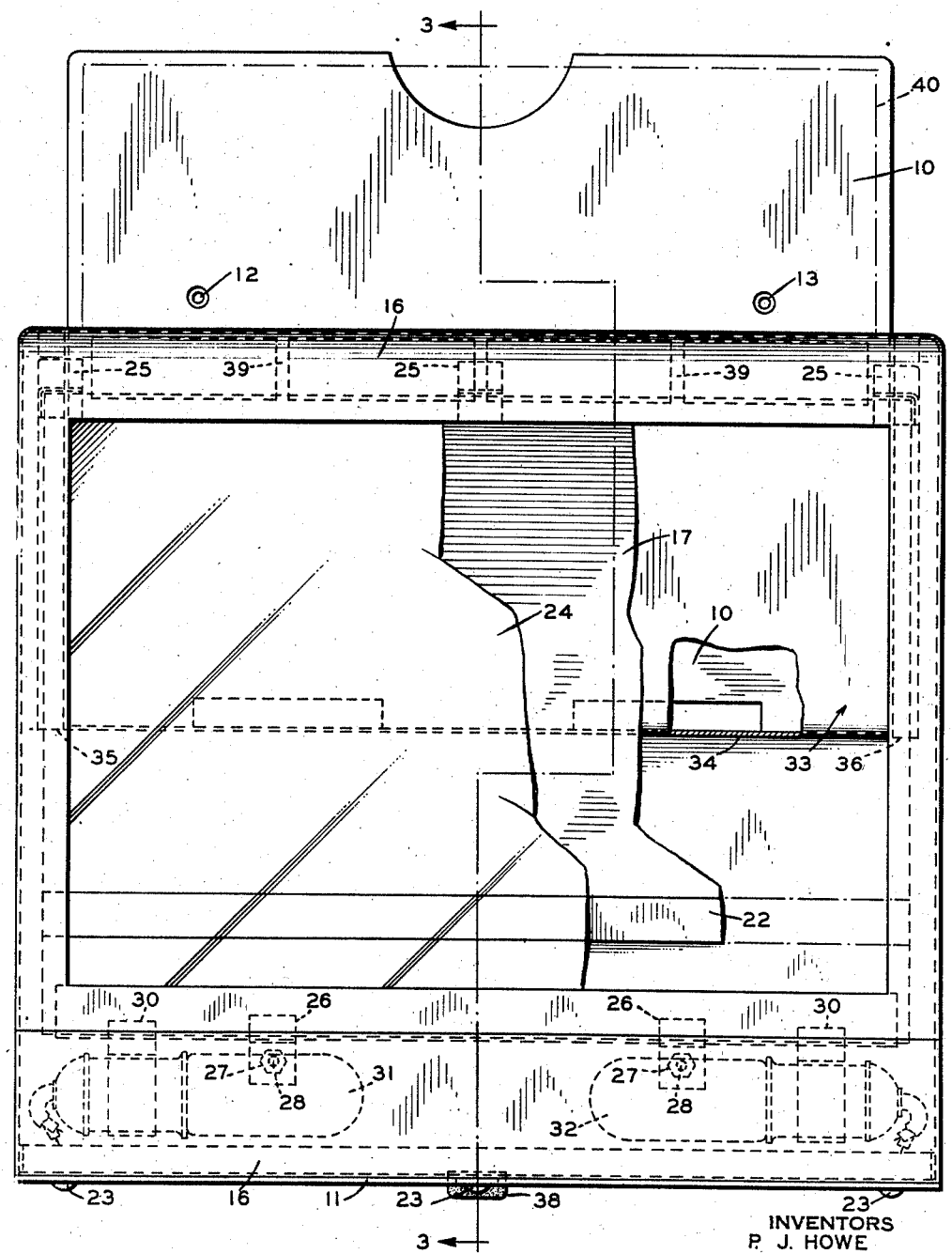

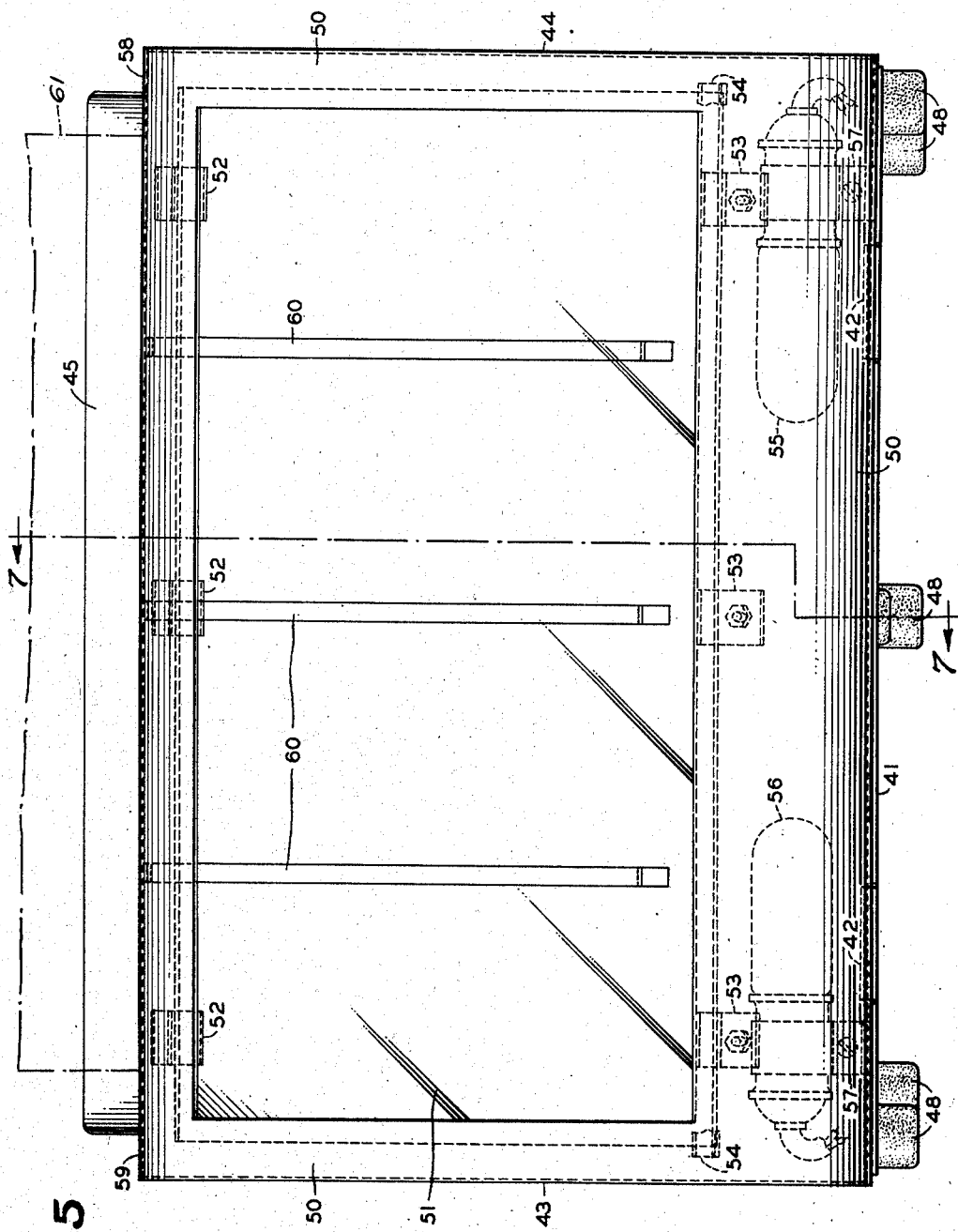

Sept. 15, 1942.　　　P. J. HOWE ET AL　　　2,295,994
ILLUMINATED DISPLAY DEVICE
Filed July 10, 1940　　　4 Sheets-Sheet 4
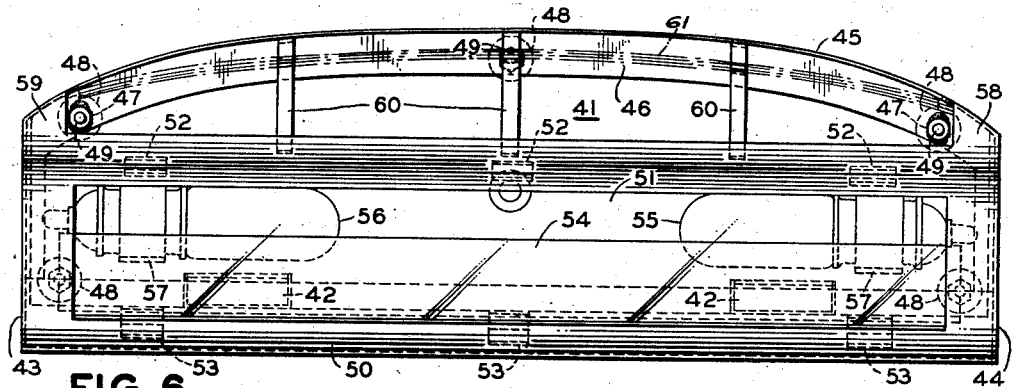
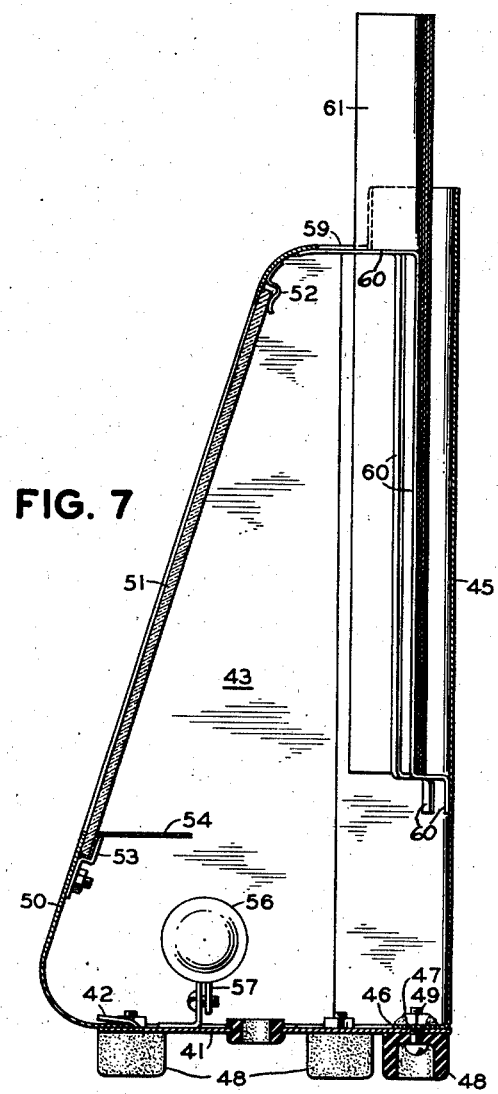

Patented Sept. 15, 1942

2,295,994

UNITED STATES PATENT OFFICE 2,295,994

ILLUMINATED DISPLAY DEVICE

Paul J. Howe, Ridgewood, N. J., and Clement H. Wyss, Jr., Tuckahoe, N. Y., assignors to The Western Union Telegraph Company, New York, N. Y., a corporation of New York Application July 10, 1940, Serial No. 344,716

5 Claims. (Cl. 40—132)

This invention relates to illuminated display devices and particularly to devices of the rack or pocket type which are employed to display articles of sheet material such as advertising circulars, telegrams or the like.

It is an object of the invention to provide facilities whereby a translucent panel and an article of sheet material carried by the panel-supporting structure are illuminated from a common source of light.

Another object of the invention is to provide a device having a translucent sign and a pocket compactly arranged so that a source of light may be utilized to illuminate both the sign and any sheet material which may be held in the pocket.

Another object of the invention is to provide, in a device having a translucent panel and a pocket formed in the panel-supporting structure to receive sheet material, means whereby the panel and the sheet material mutually contribute to the illumination of the other by a common source of light.

The display device provided by the instant invention makes it possible to furnish an attractive means for displaying printed sheet material. The illumination which is provided for the sign and the material displayed by the device serves to attract attention to the articles displayed, particularly when the device is located on a counter or the side wall of a room or office which is not strongly illuminated from an outside source. There is then produced a marked contrast between a relatively dark background and the attractively lighted display device.

The invention is disclosed in two illustrative embodiments which will be described in conjunction with the accompanying drawings, of which:

Fig. 1 is a front elevation of one form of a display device;

Fig. 2 is a top view of said one form of a device embodying the invention;

Fig. 3 is a sectional view taken on the line 3—3 of Fig. 1;

Fig. 4 is a sectional view taken on the line 4—4 of Fig. 3;

Fig. 5 is a front elevation of a second embodiment of the invention;

Fig. 6 is a top view of said second embodiment of the invention; and

Fig. 7 is a sectional view taken on the line 7—7 of Fig. 5.

Having reference now to Figs. 1 to 4 of the drawings, one embodiment of the device comprises a back 10 and a bottom portion 11 which is formed integrally with the back. Two mounting holes 12 and 13 are formed in the back 10 so that the device may be attached by means of screws inserted through the holes to any desired supporting structure such as the edge of a counter for example. The two sides 14 and 15, the front 16, a partition 17 which extends obliquely from a point adjacent the upper edge of the front 16 to the back 10 and a plurality of angles 18, 19, 20 and 21 are preferably stamped from one sheet of metal and formed in the manner shown in the drawings. The partition 17 is welded at the point 22 to the back 10. The angular members 18, 19, 20 and 21 are provided with tapped holes into which are threaded a plurality of screws 23 which are also passed through suitable holes formed in the bottom 11, thereby attaching the superstructure of the device to the bottom.

The major portion of the front of the device 16 is cut away so that a frame is formed. There is set into this frame a translucent panel 24 which is held in place by means of a plurality of fixed brackets 25 which are welded or otherwise permanently attached to the front 16 and by means of a plurality of removable brackets 26. The removable brackets are attached to the lower portion of the front 16 by means of nuts 27 which are threaded respectively onto a plurality of studs 28 welded to the inside of the front 16. An elongated angular member 29 which extends across the entire width of the panel 24 is also clamped in place by the brackets 26.

Attached to the back 10 of the device is a plurality of supporting clamps 30 which serve to mount a plurality of light sources such as 31 and 32. These lamps are positioned as shown at the bottom part of the chamber formed by the two sides 14 and 15, the panel 24 and the oblique partition 17.

A receptacle or pocket is formed between the partition 17 and the back 10 by a member 33 which is made with an angular portion 34 at the bottom and two other angular portions 35 and 36 at the sides. These three angular members are welded to the back 10 thereby forming a pocket which is open at the top. A stiffening member 37 is provided between the upper edge of the pocket member 33 and the partition 17 and extends through the entire width of the device.

Another opening is formed in the bottom 11 and is fitted with an insulating bushing 38 so that a wire or cable may be led into the device for the purpose of furnishing electrical power to operate the lights. There is provided between the upper portion of the front 16 and the top of the partition 17 a plurality of ribs such as 39, This ribbed structure forms a series of rectangular apertures disposed suitably at the upper part of the light chamber.

The light which emanates from the lamps 31 and 32 is employed to flood the space between the panel 24 and the partition 17. The inside surfaces of the light chamber are all conditioned to reflect light. The angular member 29 serves to cut off the direct light from the sources at the power portion of the translucent panel. Therefore, there is obtained a substantially uniform illumination of the panel by means of the lamps 31 and 32 in conjunction with the various reflecting services. The angular disposition of the partition 17 with respect to the panel 24 is such that this uniformity of illumination is obtained. The panel may be inscribed with any desired indicia and the color scheme may be arranged to suit any particular need. A plurality of telegram blanks 40 or other sheet material may be held in the pocket provided from which they may be easily removed. A substantial portion of the light with which the light chamber is flooded is reflected from the inside surface of the translucent panel 24 through the openings formed by the separating ribs 39 and is directed onto the visible portion of the front piece of sheet material held in the pocket. In this manner the heading is illuminated by making use of the same source of illumination which is employed to light the translucent panel.

Reference is now made to Figs. 5, 6 and 7, which illustrate another embodiment of the invention. The display device is mounted upon a base 41 which has formed along the forward edge thereof a plurality of retaining lugs 42. These are formed by making parallel cuts in the edge of the base and the material included therebetween bent up in the manner shown in Fig. 7. The two sides 43 and 44 and the back 45 are formed from one sheet of metal in the manner shown in the drawings. The back 45 of the device is given a curvature which is best illustrated in Fig. 6, and has formed at the lower edge thereof an angular member 46. There is rigidly attached to the angular member 46 a plurality of nuts 47. The structure rests on a plurality of feet 48 which are attached to the under side of the base 41 by means of screws and cooperating nuts. The screws 49 which are used to attach the feet located at the back of the device are passed through holes formed in the base and are threaded into the fixed nuts 47. In this manner the back 45 is securely attached to the base 41. The front 50 is disposed obliquely with reference to the back 45 and the upper and lower portions thereof are bent toward the back as best illustrated in Fig. 7. The front is attached along its vertical edges to the front edges of the sides 43 and 44. The lower edge of the front 50 is inserted in the narrow space between the base proper and the lugs 42, in which position it is firmly held.

The major portion of the front 50 is cut away so that a frame is formed. There is set into this frame a translucent panel 51 which is held in place by means of a plurality of fixed brackets 52 which are welded or otherwise permanently attached to the upper portion of the front 50 and also by means of a plurality of removable brackets 53 located adjacent the lower portion of the device. The brackets 53 also serve to hold in place a shield 54 which extends across the lower edge of the panel. A pair of lamps 55 and 56 are mounted in the lower part of the device by means of brackets 57 attached to the base 41.

A portion of the top of the device is left open and the front 50 has formed therein two extended portions 58 and 59 adjacent the top outer edges thereof. These extended portions are attached to the back 45 thereby imparting rigidity to the structure. There is attached to the top edge of the front member 50 a plurality of metal strips 60 which are bent in the manner best illustrated in Fig. 7. The lower ends of these strips are attached to the back member 45. Thus, there is formed between the curved back 45 and the vertical portions of the strips 60 a pocket into which may be placed one or more sheets of flexible material 61.

The light emanating from the lamps 55 and 56 floods the space included between the panel 51 and the inside of the supporting structure. All of the inside surfaces of this structure are conditioned to reflect light. The angular shield 54 serves to cut off the major portion of the direct light from the sources so that the lower portion of the panel 51 is not more brightly illuminated than some of the other portions. The shield is so proportioned and positioned with respect to the light sources and the panel that a substantially uniform illumination of the panel is secured in cooperation with the various reflecting surfaces.

In this embodiment of the invention it will be noted that, because of the substantially open character of the pocket adjacent the light chamber, one of the reflecting surfaces employed to aid in the illumination of the panel 51 is the surface of that portion of the sheet material 61 which extends into the light chamber. Also, as in the previously described embodiment, a portion of the light with which the chamber is flooded is directed by means of the opening formed in the top of the structure onto the exposed surface of the sheet material 61. Thus, the translucent panel 51 and a portion of the sheet material 61 cooperate with a common source of light to contribute mutually to the illumination of the other.

It will also be noted that, because of the curvature imparted to the sheet material by the configuration of the pocket, a concave reflecting surface is formed at the back of the light chamber. Such a surface produces a desirable distribution of the light rays whereby uniformity of illumination of the panel is more easily attained. Also, the curvature of the pocket performs another important function in that it confines the sheet material in such a manner that the tendency to droop which is inherent in light flexible sheets is lessened to a marked degree. Thus, the portions of the sheet material which extend upward from the top of the display device are always substantially vertical so that the light which is directed onto these portions through the top of the structure is uniformly intercepted by all exposed portions of the sheet material 61.

The nature of the invention may be ascertained from the foregoing description of two illustrative embodiments, both of which are susceptible of various modifications without departing from the spirit of the invention. The scope of the invention is set forth in the appended claims.

What is claimed is:

1. In a display device, a translucent panel forming the front side of said device, an opaque member spaced from and substantially parallel to said panel and forming the back side of said device, said member extending above the top of said panel, a partition extending obliquely from a point adjacent the upper edge of said panel to said opaque member, said partition being provided with a plurality of apertures adjacent the upper edge thereof and the panel-facing surface thereof being conditioned to reflect light, an upwardly opening pocket disposed between said partition and said opaque member to receive sheet material, and a source of light disposed between said panel and said partition adjacent the lower portions thereof.

2. In a display device, the combination of a translucent panel, a plurality of members having reflecting surfaces disposed at the rear of said panel, one of said members embodying an aperture, a pocket disposed at the rear of said panel and arranged to receive sheet material, said pocket being substantially open on its panel-facing side whereby a portion of the sheet material forms one of said reflecting surfaces, and means for illuminating the space enclosed by said panel and said members, the light being transmitted in part by said panel and in part by the apertured portion of said one member to illuminate both the panel and another portion of the sheet material.

3. A display device comprising a light-reflecting chamber, a translucent panel forming the front side of said chamber, a pocket located within and at the rear of said chamber and being substantially open on the side adjacent said chamber, flexible sheet material contained in said pocket, a portion of said sheet material protruding from the top of said pocket, a source of light disposed at the lower portion of said chamber to illuminate said panel, means including the surface of said sheet material extending within the reflecting chamber for distributing the light emanating from said source, said chamber having a plurality of openings adjacent the top thereof, and means including said openings to transmit light from said source to the protruding portion of said sheet material.

4. The invention as set forth in claim 3, further characterized in that the pocket is curved to impart a substantially concave configuration to the sheet material contained therein.

5. In a display device, a translucent panel forming a substantial portion of the front side of said device, an upwardly opening pocket to hold sheet material with a portion of said material extending beyond the top of said device, said pocket being disposed at the rear of said panel in spaced relation thereto, a plurality of spaced ribs connecting said pocket to the front side of said device at points adjacent the upper edge of said panel, and means adjacent the lower edge of said panel for illuminating the space between said panel and said pocket, the light being transmitted in part by said panel and in part by the spaces between said ribs to illuminate both the panel and the upwardly extending portion of said sheet material.

PAUL J. HOWE.
CLEMENT H. WYSS, JR.